United States Patent

[11] 3,633,055

[72] Inventor  Ivan W. Maier
              Lombard, Ill.
[21] Appl. No. 48,104
[22] Filed     June 22, 1970
[45] Patented  Jan. 4, 1972
[73] Assignee  Molon Motor & Coil Corp.
               Rolling Meadows, Ill.

[54] PERMANENT MAGNET MOTOR
     10 Claims, 20 Drawing Figs.

[52] U.S. Cl. .................................... 310/156,
                                                   310/162
[51] Int. Cl. .................................... H02k 21/12
[50] Field of Search .......................... 310/156,
     152, 162, 180, 163, 194, 164, 181, 49, 46

[56]              References Cited
                UNITED STATES PATENTS
3,119,941  1/1964   Guiot ........................... 310/156
3,508,091  4/1970   Kavanaugh .................... 310/156
3,495,113  2/1970   Haydon ......................... 310/156
3,032,670  5/1962   Fritz ............................. 310/164
3,541,363  11/1970  Vettermann .................. 310/156
3,496,393  2/1970   Reifman ........................ 310/156

Primary Examiner—D. X. Sliney
Assistant Examiner—R. Skudy
Attorney—Kinzer, Dorn and Zickert ABSTRACT: A small permanent magnet synchronous motor having one or more pairs of stator sections mounted in tandem. Each stator section includes a first annular stator member of generally U-shaped cross section with multiple pole pieces around the inside of the annulus parallel to the axis, the pole pieces preferably being of tapered construction. A similar second annular stator member interfits with the first stator member; the pole pieces of the second stator member are interleaved one-for-one with the pole pieces of the first stator member. The stator members are formed of mild low-carbon steel that is annealed after fabrication. In each stator section, a coil encompasses the pole pieces of the stator members. The rotor is a permanent magnet ring with as many poles as the stator sections, mounted in a single-unitary bearing structure. The motor is assembled by coating one inner frame member with an epoxy resin adhesive, assembling the inner frame members back-to-back on a gauge hub with interengaging index elements assuring accurate alignment at a displacement of 90° electrically between the stator sections, then adding the coils and outer stator members.

PATENTED JAN 4 1972

INVENTOR
IVAN MAIER

BY
Kinzer, Dorn and Zickert
ATTORNEYS

INVENTOR
IVAN MAIER

INVENTOR
IVAN MAIER

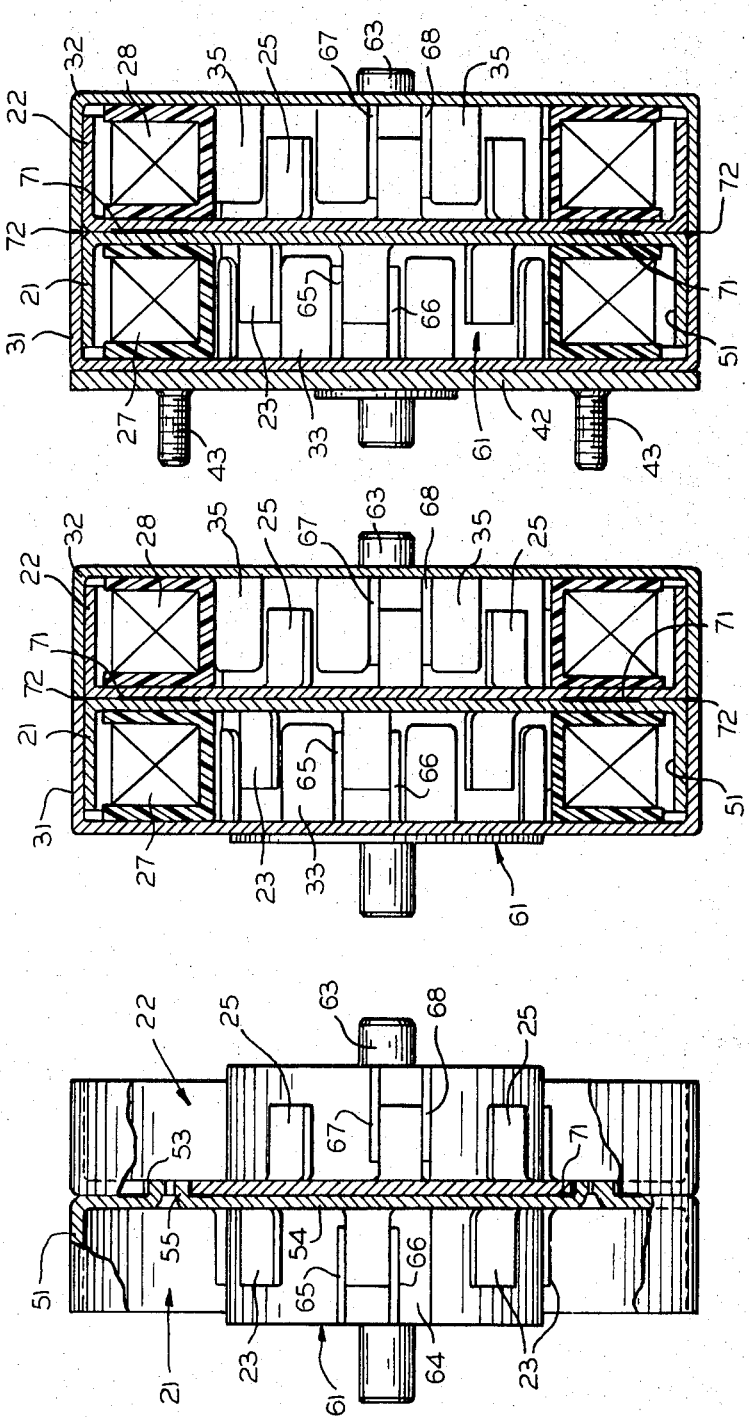

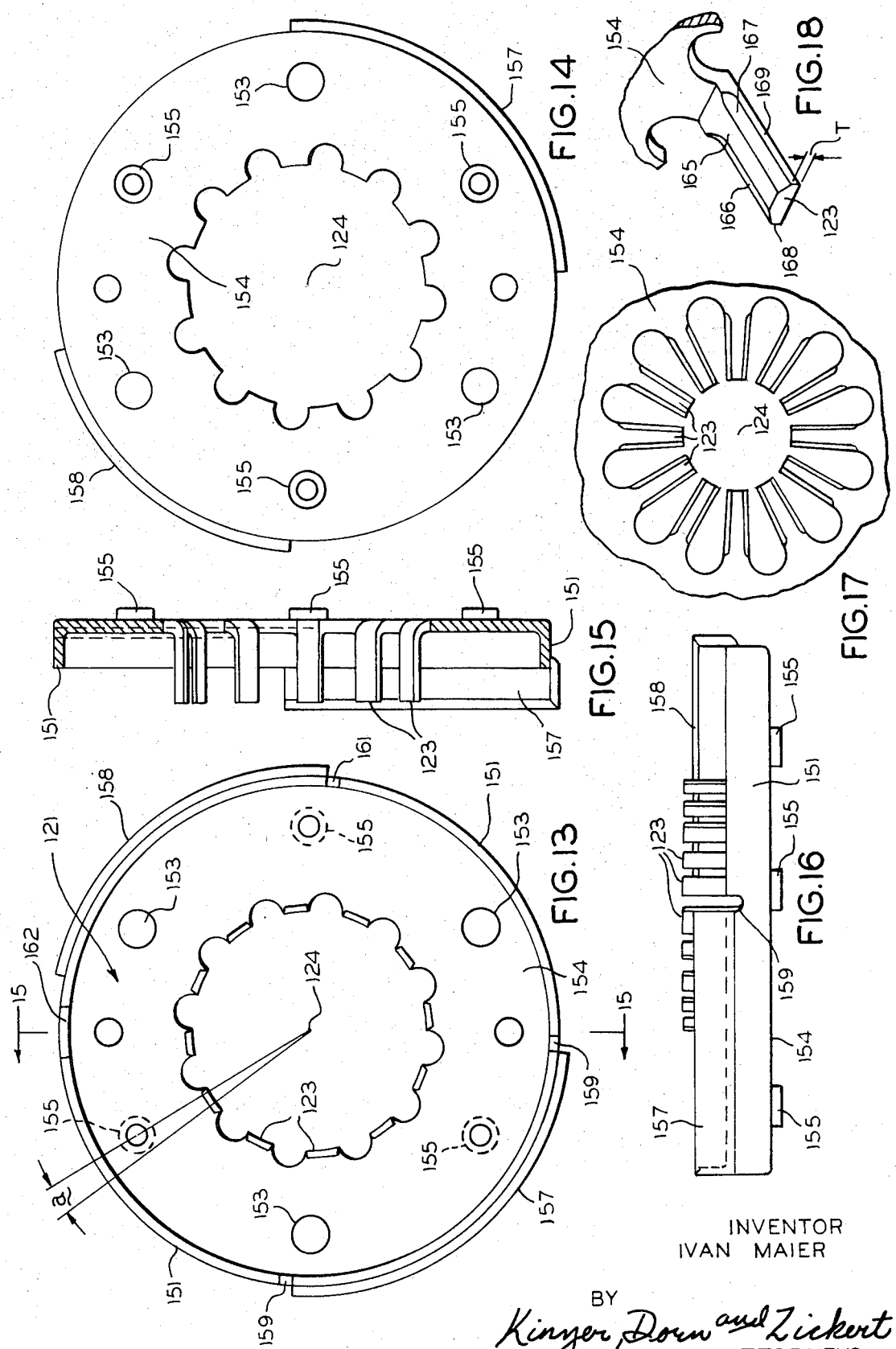

INVENTOR
IVAN MAIER

BY
Kinzer, Dorn and Zickert
ATTORNEYS 3,633,055

PERMANENT MAGNET MOTOR

BACKGROUND OF THE INVENTION

There are numerous applications for subfractional reversible synchronous motors. One important use for a subfractional reversible synchronous motor is in the operation of tape decks and other tape mechanisms, in which constant speed is essential to accurate recording and reproduction operations. In particular, magnetic tape players to be used in automobiles and in home environments must provide constant speed and must supply a reasonable power output. The motors employed must be capable of operation with variable voltage inputs and poor input waveforms. Nevertheless, cost is an important factor and must be held to a minimum.

The speed of response, in many applications, is also critical. It is highly desirable that a subfractional synchronous motor pull in to full speed in less than one cycle. This is especially true if the motor is to be used on data processing equipment or any other applications in which there are rapid and frequent transitions from one mode of operation to another. It is almost equally important that the motor stop quickly once it is switched off, to avoid overrunning.

SUMMARY OF THE INVENTION

It is a principle object of the invention, therefore, to provide a new and improved subfractional reversible synchronous motor that is capable of pulling in to full speed in less than a cycle of the power supply and that stops rapidly once power is interrupted.

Another object of the invention is to afford a new and improved subfractional reversible synchronous motor that affords high starting torque yet provides relatively high operating efficiency.

A specific object of the invention is to minimize potential inaccuracies in the bearing alignment of a subfractional synchroneous motor while at the same time reducing the costs of construction and assembly.

A further object of the invention is to provide a new and improved subfractional reversible synchronous motor, together with an improved assembly technique for the motor, that is simple and inexpensive in construction and compact in size, yet affords a reliable and adequate power output.

A subfractional reversible synchronous electrical motor constructed in accordance with the invention comprises one or more pairs of stator sections mounted in tandem. Each pair of stator sections includes two annular inner stator members mounted together in coaxial back-to-back relation. Each of the inner stator members has $n$ pole pieces, preferably of tapered construction, equally spaced around the inside of the annulus and projecting outwardly parallel to the axis of the stator member, the pole pieces of one inner stator member being angularly displaced from the pole pieces of the other by an angle of approximately $90°/n$. Two annular electrical coils are included in the motor, each being mounted in encompassing relation to the pole pieces of a respective one of the inner stator members. Two annular outer stator members of generally U-shaped cross-sectional configuration are mounted on respective ones of the inner stator members, in coaxial relation, enclosing the electrical coils. Each outer stator member has $n$ pole pieces, again preferably of tapered construction, projecting inwardly parallel to the motor axis and interleaved one-for-one in an annular array with the pole pieces of the associated one of the inner stator members. A shaft extends coaxially through the stator members and an annular permanent magnet rotor is mounted on the shaft, extending through both sets of pole pieces in coaxial relation thereto. The permanent magnet rotor has $2n$ equiangularly spaced magnetic poles.

The method of manufacturing a subfractional reversible synchronous electric motor, in accordance with the invention, comprises the following steps:

A. Fabricating two identical annular inner stator frame members each having a plurality of index protrusions and a corresponding plurality of index apertures;

B. Fabricating two identical outer stator frame members of substantially U-shaped cross-sectional configuration;

C. Coating at least one of the inner stator members with an annular coating of an epoxy resin adhesive;

D. Fitting the two inner stator members together in accurately aligned back-to-back relation with the index protrusions of one engaging in the index apertures of the other to form an inner stator subassembly;

E. Mounting a pair of annular electrical coils in the subassembly, one on each inner stator member;

F. Coating the outer rim of at least one of the outer stator members with an epoxy resin adhesive;

G. Mounting the two outer stator members on the two inner stator members with the rim of each of the two outer stator members engaging the rim of another stator member; and H. Heat curing the adhesive to bond all of the stator members together and afford a stable motor assembly.

BRIEF DESCRIPTION OF THE DRAWINGS

FIGS. 10, 11 and 12 are sequential views utilized to explain the assembly of the motor of FIGS. 1–7;

FIGS. 13 and 14 are a front and rear elevation view of a stator member utilized in another embodiment of the invention;

FIG. 15 is a sectional view taken approximately along line 15–15 in FIG. 13;

FIG. 16 is a side elevation view of the stator member of FIG. 13;

FIGS. 17 and 18 are detail views of portions of the stator member of FIGS. 13–16;

DESCRIPTION OF THE PREFERRED EMBODIMENT

Figure 1:
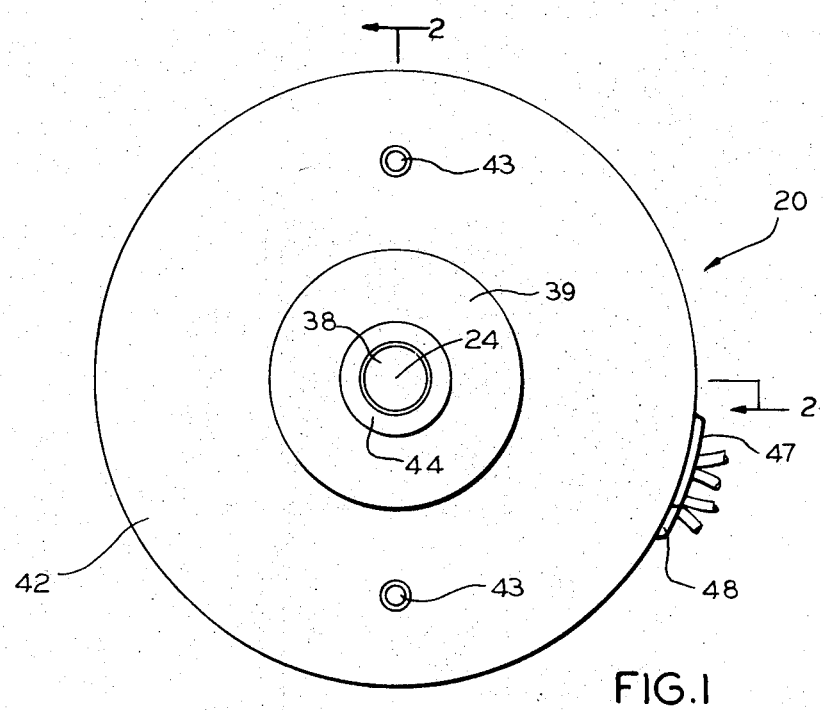
FIG. 1 is a front elevation view of a motor constructed in accordance with one embodiment of the present invention.
Figure 2:
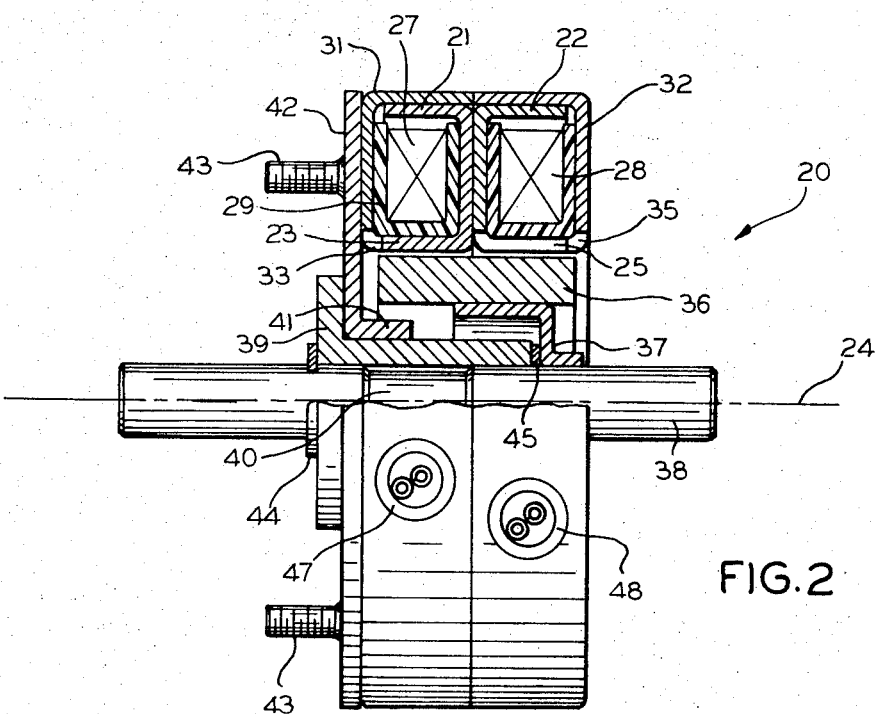
FIG. 2 is a side elevation view of the motor of FIG. 1, partly in cross section.
Figure 3:
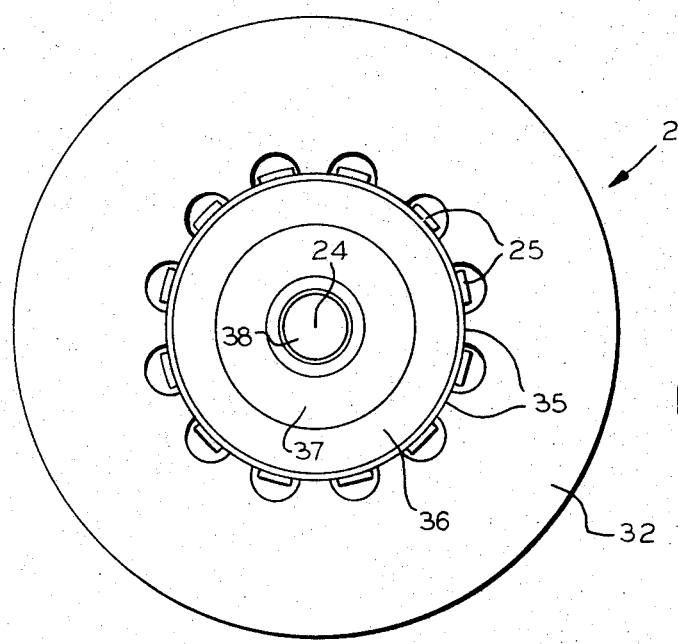
FIG. 3 is a rear elevation view of the motor.
Figure 4:
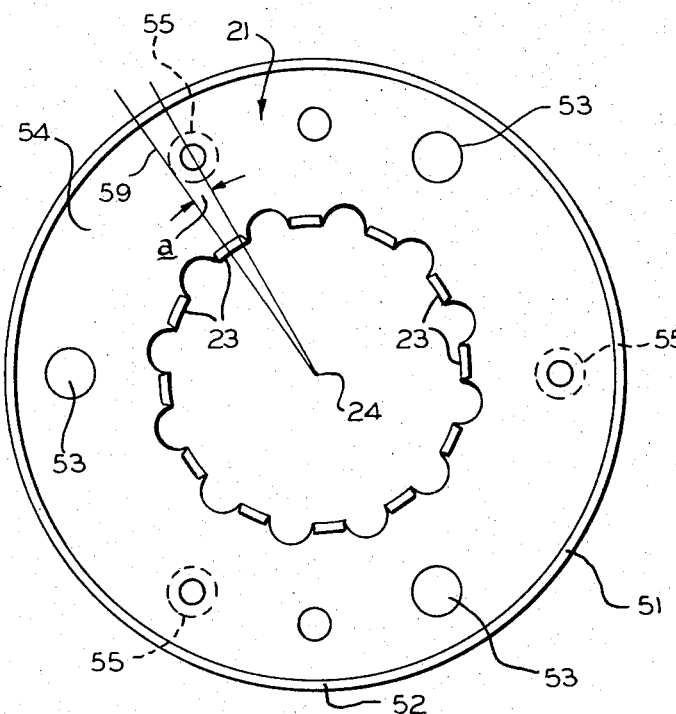
FIG. 4 is a front elevation view of one of the inner stator members for the motor.
Figure 5:
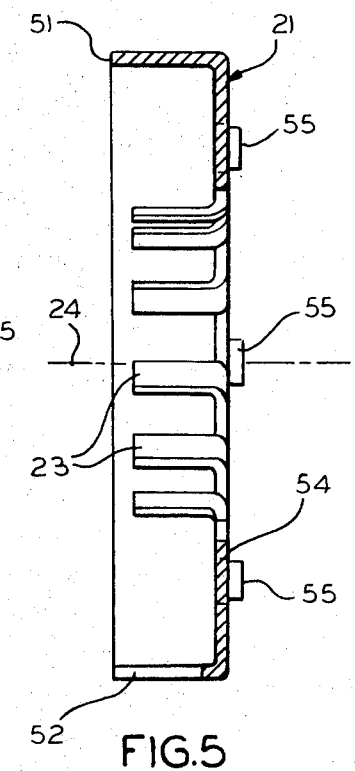
FIG. 5 is a side elevation view of the stator member of FIG. 4 with the edge portion cut away to show the inner structure.
Figure 6:
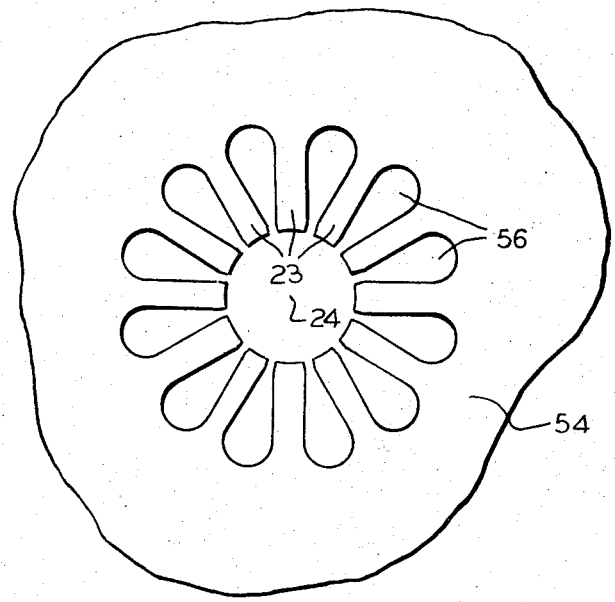
FIGS. 6 and 7 are detail views of portions of the inner stator member of FIGS. 4 and 5.
Figure 7:
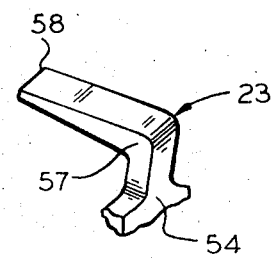

The motor 20 shown in FIGS. 1–9 comprises a pair of annular inner stator members 21 and 22, each of generally U-shaped cross-sectional configuration, mounted together in coaxial back-to-back relation. Stator member 21 has a plurality of $n$ individual pole pieces 23 equally spaced around the inside of the annulus as best shown in FIGS. 4 and 5. In the illustrated construction, there are 12 pole pieces 23 equally spaced around the axis 24 of the inner stator member 21 (FIGS. 4 and 5). That is, $n=12$. Axis 24 is also the axis of motor 20 (FIGS. 1–3). The shape of pole pieces 23 is shown in FIGS. 6 and 7.

The other inner stator member 22 of motor 20 is similar in construction to stator member 21 and hence has not been shown in complete detail in the drawings. Stator member 22 has 12 pole pieces 25 equiangularly distributed around motor axis 24. For each of the inner stator members, the pole pieces project outwardly parallel to the motor axis. The term "inner stator member" is used herein to identify the axially interiorly located stator members of the stator assembly of a motor and has no necessary relation to the relative diameters of the stator members, as will be made more apparent in relation to the motor of FIGS. 13–18.

Motor 20 includes two annular electric coils 27 and 28. Coil 27 is formed on an appropriate bobbin 29 and is mounted within the inner stator member 21 in encompassing relation to the pole pieces 23. Similarly, coil 28 is disposed within inner stator member 22 in encompassing relation to the pole pieces 25.

A pair of annular outer stator members 31 and 32 are included in motor 20. Each of these outer stator members is of generally U-shaped cross-sectional configuration, as shown in FIG. 2. The outer stator member 31 is mounted upon the inner stator member 21 in coaxial relation thereto. Because stator member 31 is slightly larger in diameter than stator member 21 and is also somewhat longer in axial length, the two stator members 21 and 31 overlap and afford a substantially complete enclosure for coil 27. The outer stator member 31 includes a plurality of n individual pole pieces 33 of the same tapered configuration as pole pieces 23 (see FIGS. 6, 7). Pole pieces 33 project inwardly parallel to the motor axis 24 and are interleaved one-for-one in an annular array with the pole pieces 23 of stator member 21.

The second outer stator member 32 is similar in construction. It includes 12 individual pole pieces 35 that project inwardly parallel to the motor axis 24 and that are interleaved one-for-one in an annular array with the pole pieces 25 of the inner stator member 22. The two stator members 22 and 32 afford a substantially complete enclosure for the annular electrical coil 28.

The rotor of motor 20 comprises an annular permanent magnet 36 that extends through both sets of pole pieces 23, 33 and 25, 35, as shown in FIG. 2. The permanent magnet 36 is preferably formed of a ceramic permanent magnet material, and is mounted on an aluminum hub 37 that in turn is mounted on a motor shaft 38. A press fit can be used to secure hub 37 to shaft 38, or an epoxy resin or other sealant bond can be employed for this purpose. This is also true of the bond between hub 37 and magnet 36; however, an epoxy resin or other sealant bond is preferred for the magnet to avoid potential fracturing of the magnet. Shaft 38 is journaled in an elongated sleeve bearing 39. The shaft has a central recess 40, so that the single sleeve 39 in effect provides two spaced bearings. The combination of hub 37, shaft 38 and sleeve 39 facilitates use of the assembly technique described hereinafter, materially reduces the cost of the motor, and eliminates alignment requirements of separate bearings with no sacrifice in performance.

Bearing 39 is press fit into a flange 41 in a bearing bracket 42 that also constitutes a mounting plate for motor 20. Bearing bracket 42 is epoxy bonded to or otherwise fixedly mounted upon the outer stator member 31. It carries a pair of mounting studs 43 or other suitable mounting means for the motor. A clamping washer 44 mounted in a groove in shaft 38 retains the shaft in position within motor 20. A thrust washer 45 may be provided between bearing 39 and hub 37. The electrical leads for the two coils 27 and 28 are brought out from the stator members through appropriate strain-release connections 47 and 48.

The performance of motor 20 is critically affected by the configuration and the fabrication of the stator members 21, 22, 31 and 32. Stator member 21 is shown in detail in FIGS. 4-7. The other inner stator member 22 is essentially identical in construction. Moreover, the two outer stator members 31 and 32 are essentially similar, although they are of slightly larger outside diameter and greater axial length to fit around the inner stator members as shown in FIG. 2 and as described more fully hereinafter in connection with FIGS. 10-12. Thus, the critical features of both the inner and outer stator members can be considered in connection with FIGS. 4-7.

As shown in FIGS. 4 and 5, the inner stator member 21 is substantially U-shaped in cross section, the pole pieces 23 forming one leg of the U. The outer rim 51 of the stator member is slightly longer, in an axial direction, than the pole pieces 23. The rim 51 has an aperture 52 to provide for connection of electrical leads to the coil 27 when the motor is assembled.

Three indexing apertures 53 are formed in the backplate 54 of stator member 21, the apertures 53 being displaced approximately 120° from each other. In addition, three indexing bosses or extrusions 55 are formed in backplate 54. The extrusions 55 are also aligned at approximately 120° with respect to each other. The extrusions 55 and apertures 53 are located symmetrically with respect to each other; however, the apertures 53 and extrusions 55 are displaced through an angle $a$ of approximately 3.75° clockwise from the centerline 59 of the pole pieces 23. Angle $a$ is determined from the number of poles in the motor in accordance with the expression $a = 90°/2n$. For a 24 pole motor such as motor 20, this is an angular displacement of 45° on an electrical basis, and this is true of any other number of poles. The extrusions 55 and the apertures 53 afford an indexing means for obtaining a desired alignment in assembly of the two inner stator members of the motor, as described more fully hereinafter. There is no need to provide corresponding indexing means on the outer stator members 31 and 32 (FIGS. 2, 3) since their orientation is determined by the alignment of the inner stator members.

FIG. 6 is a detail view that illustrates the configuration of the pole pieces 23 as flattened out into a common plane with the backplate 54 of stator member 21, a configuration attained if the pole pieces are stamped out of flat stock prior to shaping to the U-shaped construction. As seen in FIG. 6, the sides of each pole piece 23 are preferably approximately parallel to each other and parallel to a radius to the axis 24. The corners of the pole pieces are preferably chamfered or otherwise formed so as to avoid sharp corners. The base of the slot 56 between each pair of teeth 23 is of semicircular configuration to minimize the possibility of saturation at the bases of the pole pieces. This configuration for the pole pieces can be quite useful in obtaining optimum performance from the motor 20.

The configuration of the pole pieces is shown in detail in FIG. 7. Each pole piece is tapered from a thick root portion 57 to a thin free end 58. In a typical construction the thickness of the pole piece 23 ranges from 0.038 inch at the base 57 to approximately 0.01 inch at the tip 58; the tooth width is 0.102 inch, in a motor with a rotor diameter of 1.007 inch. This tapered construction substantially reduces flux leakage between pole pieces by reducing the total surface area of adjacent pole pieces facing each other without causing saturation of the pole pieces. The taper of the pole pieces is preferably of the order of 3:1 or more. The high ratio of pole piece width to thickness, ranging from 2.7 to over 10, gives a high percentage of working flux; this ratio should be kept above 2.5.

The material used in the fabrication of the stator members for the motor, and the treatment of that material, can also be quite important in realizing effective motor operation. Preferably, the stator members are fabricated from a mild low carbon steel having essentially no silicon content. After the stator members have been bent, coined, and otherwise processed to their final configuration, they should be annealed to relieve any work hardening that occurs during the fabrication. This makes it possible to obtain maximum flux densities within the stator members, an important consideration when it is recognized that the stator members must be operated at near saturation conditions, particularly in the pole pieces, if effective and efficient motor operation is to be obtained.

Figures 8, 9:
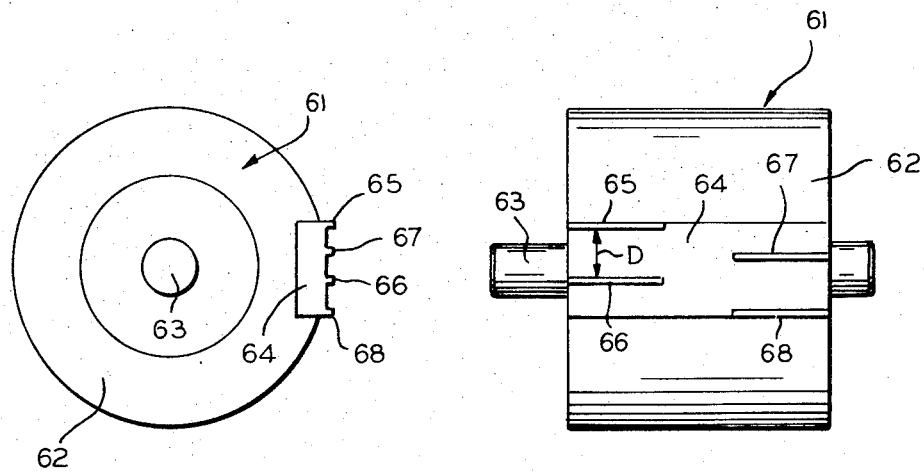
FIG. 8 is an end elevation view of a gauge hub used in assembling the motor of FIGS. 1–7.
FIG. 9 is a side elevation view of the gauge hub of FIG. 8.

FIGS. 8 and 9 illustrate a mounting fixture 61 utilized in the assembly of motor 20. Fixture 61 comprises an aluminum hub 62 mounted upon a stainless steel or other nonmagnetic shaft 63. A gauge member 64 is set into hub 62; the gauge member has four gauge projections 65, 66, 67 and 68. Projections 65 and 66 are spaced from each other by a distance D that is approximately equal to the width of one of the pole pieces 23, the thickness of each of the two gauge projections 65 and 66 being approximately equal to the required spacing between each of the pole pieces 23 and the adjacent interleaved pole pieces 33 (FIG. 2). Similarly, gauge projections 67 and 68 are spaced from each other by the width of one of the pole pieces 25. Gauge projections 65, 66 are offset from gauge projections 67, 68 by an amount that corresponds to twice the angular offset angle a (FIG. 4). That is, the offset between gauge projections 65, 66 and 67, 68 corresponds to an electrical angle of 90°, a physical angle of $2a=90°/n$.

The preferred method followed in assembling motor 20 is illustrated in progressive steps in FIGS. 10, 11 and 12. At the outset, one of the two inner stator members 21 and 22 is coated with a ring 71 of epoxy resin adhesive. The adhesive ring 71 is preferably about one-fourth to one-half inch wide and encompasses the indexing extrusions and apertures 55 and 53. The adhesive can be applied to both of the inner stator members if desired.

The two inner stator members 21 and 22 are then assembled preliminarily upon the alignment hub 61 in the manner illustrated in FIG. 10. As shown therein, the two inner stator members are lined up back-to-back, with each of the indexing extrusions 55 projecting into one of the indexing apertures 53 on the other inner stator member. One of the pole pieces 23 on the inner stator member 21 is engaged between the two gauge projections 65 and 66 on hub 61. One of the pole pieces 25 of the other inner stator member 22 is engaged between the gauge projections 67 and 68. In this manner, the two inner stator members 21 and 22 are accurately aligned with each other with a total displacement between the two sets of pole pieces 23 and 25 that is equal to twice the angle a (FIG. 4). For a 24 pole motor, the actual angular displacement between the pole pieces 23 and 25 when assembled as shown in FIG. 10 is 7.5°, which is an electrical displacement of 90° for a 24 pole motor.

The next step in the assembly operation is the mounting of two coil assemblies 27 and 28 in the two inner stator members 21 and 22, in encompassing relation to the pole pieces of the inner stator members, as shown in FIG. 11. The two outer stator members 31 and 32 are then mounted over the inner stator members 21 and 22 respectively. Before the two outer stator members are mounted in the assembly as shown in FIG. 11, the rim of one or both is coated with an epoxy resin adhesive as indicated by reference numeral 72. Two of the pole pieces 33 of outer stator member 31 are located in engagement with the external surfaces of gauge projections 65 and 66 on alignment hub 61. Similarly, gauge projections 67 and 68 are engaged by two of the pole pieces 35 of the outer stator member 32. It is thus seen that alignment hub 61 effectively lines up all four stator members.

With the outer stator members 31 and 32 in place, the bearing bracket 42 is mounted on outer stator member 31 as shown in FIG. 12. Before the bearing bracket is positioned in the assembly, a ring of epoxy resin adhesive is applied to the bearing bracket or to the outer surface of stator member 31. Bearing bracket 42 is accurately aligned in the stator by engagement of bearing 39 (see FIG. 2) with shaft 63. The entire assembly is then pressed together in an axial direction and is heat cured to cause the epoxy resin adhesives to set. The assembly is then cooled to room temperature and the mounting hub 61 is removed from the assembly.

The rotor assembly comprising shaft 38 and magnet 36 is then mounted in the motor and clamped in place by the washer 44 as shown in FIG. 2. Assembly of the motor is complete.

Motor 20, with the construction shown in the drawings, affords a rapid response characteristic and high performance as a subfractional reversible synchronous motor. Employed as a direct drive for a tape player, it affords a long working life and functions well over a range of at least −20° to 140° F. An output exceeding 20 ounces force at 3¾ inches/second is easily achieved, with an output of 0.53 watts, in a 24 pole motor having an axial length of 1 inch and an outside diameter of 2.5 inches. The motor easily reaches full speed in about one-half cycle, using a 60-cycle supply; the motor stops in about 15° of rotation.

Figure 19:
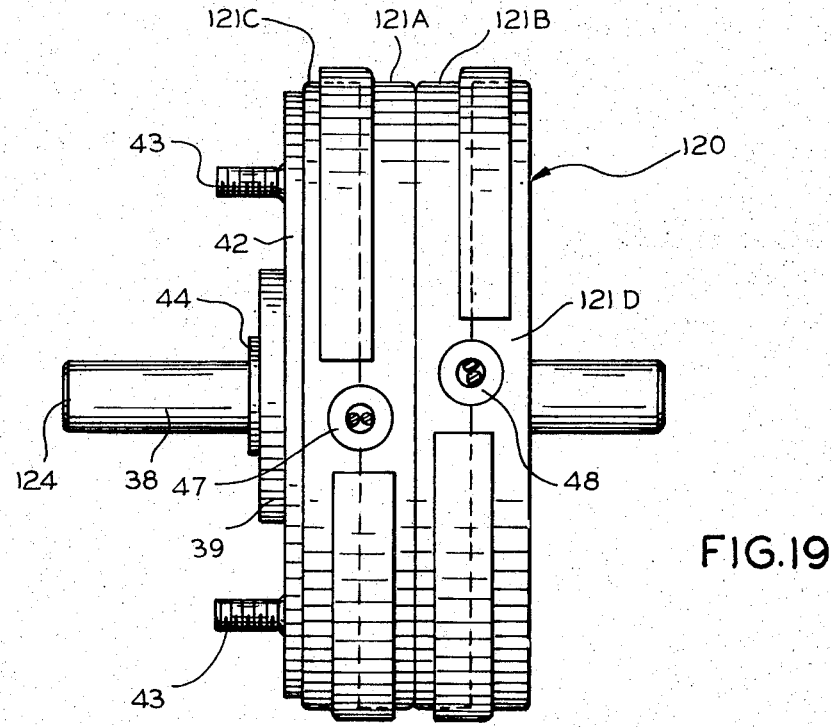
FIG. 19 is a side elevation view of an assembled motor using stator elements as shown in FIGS. 13–17.

FIGS. 13 through 18 illustrate, in detail, a stator member 121 that is utilized in the construction of a motor 120 shown in FIG. 19. Stator member 121, as such, is not differentiated as an inner or outer stator member; it can serve in either position. In the motor assembly 120, FIG. 19, two stator members 121A and 121B are assembled together in back-to-back relation as the inner stator members of the motor. Two additional stator members 121C and 121D, of identical construction, are incorporated in motor 120 as the outer stator members associated with inner stator members 121A and 121B, respectively.

Except for the stator members, motor 120 of FIG. 19 is essentially the same in construction as motor 20. Thus, motor 120 includes a shaft 38 mounted in coaxial alignment with the axis 124 of the four stator members 121A–121D. Shaft 38 is maintained in position in an elongated bearing sleeve 39 by an appropriate lock washer 44 or other simple latching means. A bearing bracket 42 is incorporated in motor 120, carrying studs 43 for mounting of the motor; the sleeve 39 is press fit or otherwise mounted in bracket 42 and the bracket is bonded, by epoxy resin or other suitable means, to the one outer stator member 121C. Although FIG. 19 does not illustrate the internal construction of motor 120, it should be understood that the motor would include a permanent magnet rotor mounted on a nonmagnetic cantilever hub like the construction illustrated by members 36 and 37 in FIG. 2.

The stator members 121A–121D used in motor 120, exemplified by member 121 (FIGS. 13–18), are rather different in construction from the stator members of the initial embodiment. Like the previously described stator members, member 121 is substantially U-shaped in cross-sectional configuration, with the pole pieces 123 forming one leg of the U. The outer rim or flange 151 of stator member 121 is not of the same axial length as the pole pieces 123. Rather, flange 151 is just slightly greater than one-half the axial length of the pole pieces. Flange 151 however, has two additional axially projecting flanges 157 and 158, as shown in FIGS. 13–16. Each of the flanges 157 and 158 is somewhat less than 90° in extent, the two flanges being located diametrically opposite each other. There are two small notches 159 in the main flange 151 at the opposite ends of the auxiliary flange 157. There is a similar small notch 161 at one end of the flange 158. The other end of the flange 158 terminates adjacent a larger aperture 162, used to receive the electrical lead mountings 47, 48 (FIG. 19).

As before, stator member 121 is provided with appropriate alignment means for aligning the stator member in back-to-back relation with another stator member of corresponding construction. The aligning means includes three indexing apertures 153 formed in the backplate 154 of the stator member and located at 120° displacement relative to each other. Three indexing extrusions 155 are formed in backplate 154, again at an alignment of 120° with respect to each other. The extrusions 155 and apertures 154 are located symmetrically relative to each other but are displaced from the centerline of the pole pieces by an angle a of approximately 3.75°, the stator member 121 again being a stator member for a 24 pole motor.

The pole pieces 123 of stator member 121 are also quite different in their construction. As shown in FIG. 17 and especially in FIG. 18, each pole piece 123 has a relatively thick central portion 165. Each of the two sides 166 and 167 is tapered outwardly, so that the edges 168 and 169 of the pole piece are quite thin in comparison with the center portion 165. Stated differently, each pole piece 123 is tapered along its sides, throughout its length, to afford extremely thin edges facing the adjacent pole pieces in the motor. In a typical construction, in which the stock from which the pole pieces 123 are formed is 0.038 inch thick, the thickness T should be of the order of 0.01 inch or less. The taper ratio should be of the order of 3:1 or more.

The tooth construction illustrated in FIGS. 17 and 18 is of material assistance in reducing flux leakage and maintaining a relatively efficient and effective motor. Sufficient steel is maintained in the pole pieces to avoid magnetic saturation. Nevertheless, the edges of the pole pieces facing the adjacent pole pieces of the other stator member are thin enough so that the flux lines between adjacent pole pieces are held to a minimum.

In assembling motor 120 (FIG. 19) the first step is to coat the outer surface of one of the two inner stator members 121A and 121B with an annular coating of epoxy resin adhesive. The two inner stator members are then fitted together in accurately aligned back-to-back relation with the index protrusions 155 of one inner stator member engaging in the index apertures 153 of the other inner st stator member. As in the case of the motor 20, the back-to-back mounting of stator members 121A and 121B aligns their pole pieces with an angular displacement of 7.5° (twice the angle $a$). Preferably, the two inner stator members 121A and 121B are initially aligned with each other on an aligning fixture like that described above in connection with FIGS. 7–12.

Continuing with the assembly of motor 120, the electrical coils are next mounted around the pole pieces of the stator members 121A and 121B. The two outer stator members 121C and 121D are then mounted in position on the inner stator members 121A and 121B as shown in FIG. 19. The parts are matched up by the rim extensions 157, 158, engaging the rim extensions of a mating stator frame member, aligning the pole pieces of the outer stator members in accurately indexed interleaved manner with the pole pieces of the associated inner stator members. Stator members matched by their rim extensions are displaced 15° relative to each other. The result is a compact, accurately interfitted assembly as shown in FIG. 19. At the time the two outer stator members are mounted in place, they can be coated with an epoxy resin adhesive for bonding to the inner stator members.

To assist in assembly of the motor, the outer flanges 157 and 158 (FIGS. 13 and 15) can be tapered as shown by the flange 157 in FIG. 15. The basic assembly method described above is followed in completing motor 120.

Figure 20:
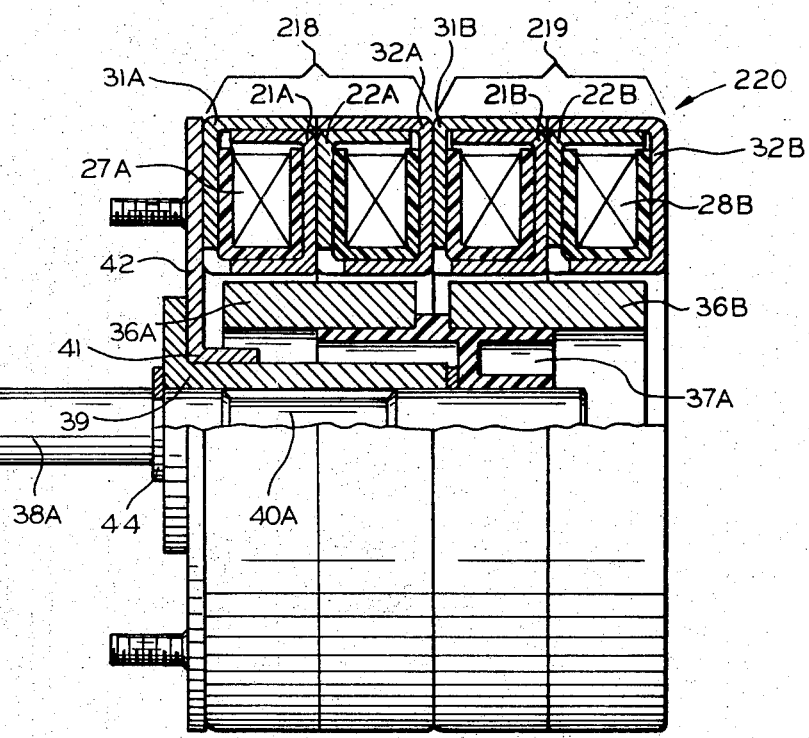
FIG. 20 is a side elevation view, partly in cross section, of a larger motor constructed in accordance with the present invention.

FIG. 20 illustrates a subfractional reversible synchronous motor 220, constituting another modification of the invention, that is similar in many basic respects to the motors described above. Motor 220 includes two stator sections 218 and 219. The first stator section 218 is essentially similar in construction to the complete stator of motor 20 (FIG. 2). Thus, stator section 218 comprises two inner stator members 21A and 22A, mounted together in back-to-back relation and partially encompassing two electrical coils 27A and 28A, respectively. The enclosure of coil 27A is completed by an outer stator member 31A mounted on stator member 21A. Similarly, the housing of second coil 28A is completed by an outer stator member 32A. All of these elements may have the same construction as described above in connection with FIGS. 1–7, or can use the stator member 121 of FIGS. 13–17 if desired.

The second stator section 219 in motor 220 is essentially identical to the first stator section 218. It includes two inner stator members 21B and 22B mounted in back-to-back relation to each other. An outer stator member 31B is mounted upon stator member 21B in encompassing relation to a coil 27B. Similarly, an outer stator member 32B is mounted on the inner stator member 22B to complete the enclosure of a coil 28B. The stator members of the two stator sections 218 and 219 are all bonded together to afford a complete and continuous assembly. Moreover, the outer stator member 31A is epoxy bonded or otherwise affixed to a bearing bracket 42 having an internal flange 41.

An elongated bearing sleeve 39 is press fit or otherwise securely mounted in flange 41 and extends axially through the two stator sections 218 and 219. A shaft 38A is journaled in the bearing sleeve 39. Shaft 38A is similar to shaft 38 (FIG. 2) except that it has a longer recessed portion 40A so that the innermost point of contact between the shaft and the bearing sleeve is at or beyond the axial center of the motor. Shaft 38A is shown as extending out of only one side of the motor but it can be brought out of the motor on the other side as well.

An aluminum or other nonmagnetic cantilever hub 37A is resin bonded or press fit to shaft 38A within the central portion of motor 220, beyond the end of bearing sleeve 39. Two annular magnets 36A and 36B are mounted on hub 37A. Magnet 36A is locked within the first stator section 218 of the motor and magnet 36B is disposed within stator section 219. It is thus seen that motor 220 has all of the characteristics of the previous described motors but provides twice the power in a motor construction of the same diameter though of extended axial length.

I claim:

1. A subfractional reversible synchronous electrical motor comprising:

a pair of annular inner stator members mounted together in coaxial back-to-back relation, each having $n$ pole pieces equally spaced around the inside of the annulus and projecting outwardly parallel to the axis thereof, with the pole pieces of one inner stator member angularly displaced from the pole pieces of the other by an angle $a$ of approximately $90°/n$;

a pair of annular electrical coils, each mounted in encompassing relation to the pole pieces of a respective one of said inner stator members;

a pair of annular outer stator members of generally U-shaped cross-sectional configuration, mounted in coaxial relation on said inner stator members to enclose said coils, each outer stator member having $n$ pole pieces projecting inwardly parallel to said axis and interleaved one-for-one in an annular array with the pole pieces of a respective one of said inner stator members;

the pole pieces on each stator member being tapered in thickness to afford edge portions, facing the pole pieces of the other stator member interleaved therewith, that are substantially smaller in thickness than the base portions of said pole pieces;

a shaft, extending coaxially through said stator members; and an annular permanent magnet rotor mounted on said shaft and extending through both sets of pole pieces, in coaxial relation, and having $2n$ equiangularly spaced magnetic poles.

2. A subfractional synchronous electrical motor according to claim 1 in which each of said inner stator members includes a number of index protrusions and an equal number of complementary index apertures, the index protrusions of each inner stator member fitting into the index apertures of the other, and in which all of the stator members are mounted together solely by being resin bonded to each other, to afford and maintain accurate angular alignment between the stator members.

3. A subfractional synchronous electrical motor according to claim 1 in which the taper of each pole piece is in the direction from base to free tip and is of the order of 3:1.

4. A subfractional synchronous electrical motor according to c claim 1 in which the taper of each pole piece is from the central portion to the side edges, and is of the order of 3:1.

5. A subfractional reversible synchronous electrical motor according to claim 1 in which the width/thickness ratio of each pole piece is at least 2.5.

6. A subfractional reversible synchronous electrical motor comprising:

a pair of annular inner stator members mounted together in coaxial back-to-back relation, each having $n$ pole pieces equally spaced around the inside of the annulus and projecting outwardly parallel to the axis thereof, with the pole pieces of one inner stator member angularly displaced from the pole pieces of the other by an angle $a$ of approximately $90°/n$;

a pair of annular electrical coils, each mounted in encompassing relation to the pole pieces of a respective one of said inner stator members;

a pair of annular outer stator members of generally U-shaped cross-sectional configuration, mounted on said inner stator members in coaxial relation and enclosing said coils, each outer stator member having $n$ pole pieces projecting inwardly parallel to said axis and interleaved one-for-one in an annular array with the pole pieces of a respective one of said inner stator members;

the pole pieces on each stator member being tapered in thickness to afford edge portions, facing the pole pieces of the other stator member interleaved therewith, that are substantially smaller in thickness than the base portions of said pole pieces;

each of said stator members being formed of mild low-carbon steel annealed after fabrication to obtain maximum flux capacity;

a shaft, extending coaxially through said stator members; and an annular permanent magnet rotor mounted on said shaft and extending through both sets of pole pieces, in coaxial relation, and having $2n$ equiangularly spaced magnetic poles.

7. A subfractional reversible synchronous motor according to claim 6, in which the taper of each of said pole pieces is at least 3:1.

8. A subfractional reversible synchronous motor according to claim 6, in which the width/thickness ratio of each pole piece is at least 2.5.

9. A subfractional reversible synchronous motor according to claim 8, said motor further comprising:

a bearing bracket affixed to one of said outer stator members;

an elongated bearing sleeve mounted on said bearing bracket and extending coaxially of said stator members;

said shaft being journaled in said bearing sleeve and having a nonmagnetic cantilever hub mounted thereon beyond the end of said sleeve, said magnet being mounted on said hub.

10. A subfractional synchronous electrical motor according to claim 11 in which each of said inner stator members includes a number of index protrusions and an equal number of complementary index apertures, the index protrusions of each inner stator member fitting into the index apertures of the other, and in which all of the stator members are mounted together solely by being resin bonded to each other, to afford and maintain accurate angular alignment between the stator members.

* * * * *